(No Model.)
S. WILLIAMS.
FENCE.
No. 283,182. Patented Aug. 14, 1883.
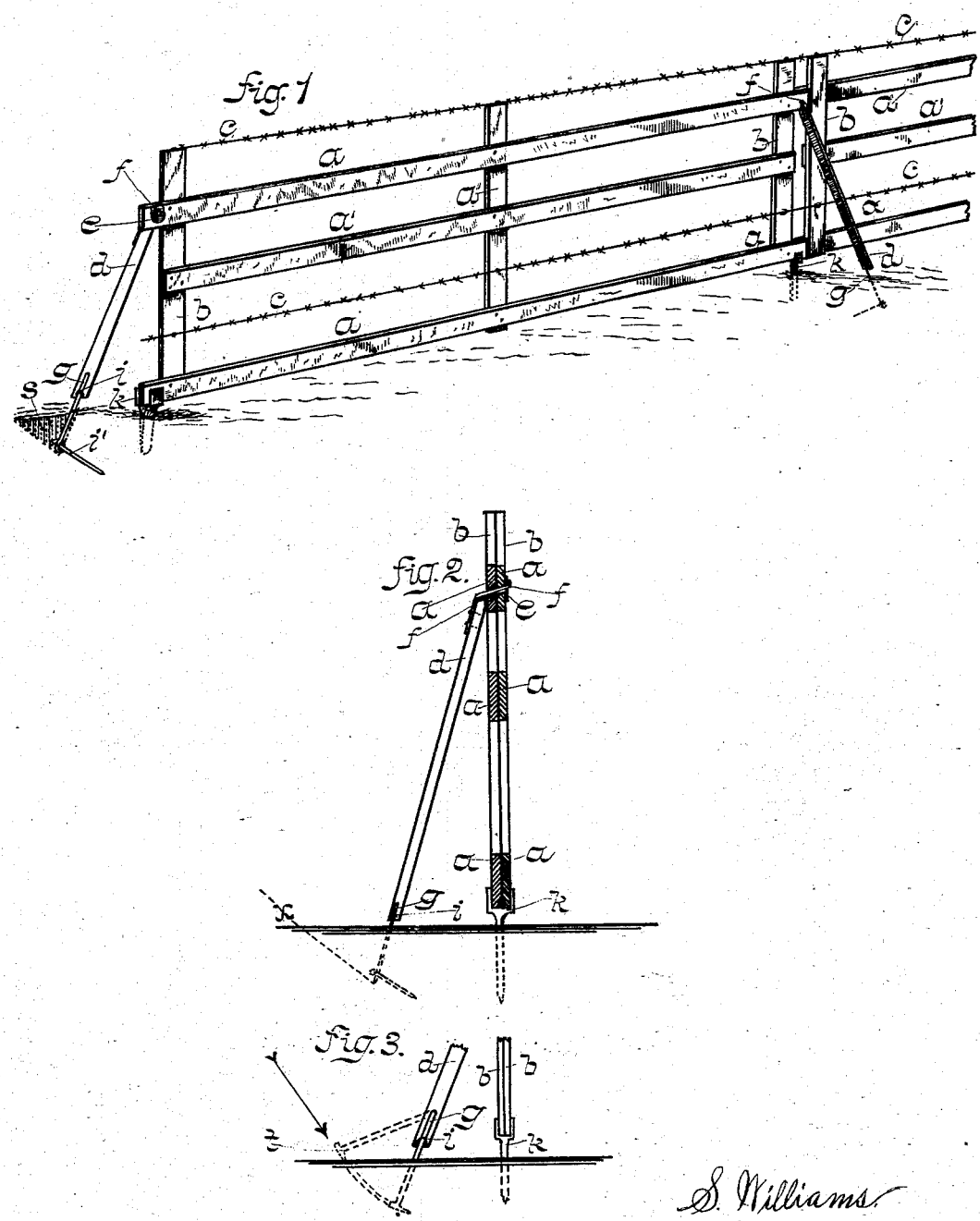
WITNESSES:
L. A. Adamson
A. G. Adamson
S. Williams
INVENTOR.
Chas. E. Adamson
HIS ATTY.

UNITED STATES PATENT OFFICE.

STEWARD WILLIAMS, OF GRANVILLE, INDIANA.

FENCE.

SPECIFICATION forming part of Letters Patent No. 283,182, dated August 14, 1883.

Application filed March 1, 1883. (No model.)

*To all whom it may concern:*

Be it known that I, STEWARD WILLIAMS, a citizen of the United States, residing at Granville, in the county of Delaware and State of Indiana, have invented a new and useful Improvement in Fences, of which the following is a specification.

My invention relates to improvements in that class of fence which is made in a straight line and without posts.

The objects of my improvements are to construct a cheap, simple, and durable fence, which may be made portable or stationary. I attain these objects by the mechanism illustrated by the accompanying drawings, in which—

Figure 1 is a perspective view of my fence. Fig. 2 is an elevation of the same, partly in section; and Fig. 3 is a modification.

Similar letters refer to similar parts throughout the several views.

My fence consists of the longitudinal boards $a$, center brace, $a''$, end boards, $b$, brace $d\ e\ f\ g\ i$, and iron foot-posts, $k$. The longitudinal boards $a$ project slightly beyond the end boards, $b$, and barbed wires C are placed at the top and near the bottom, the said parts being more firmly held together by the center brace, $a''$, all as shown in Fig. 1.

When two panels of the fence are placed together, the ends of the boards lap over each other, the lower ones resting in the post $k$, which is made forked or slotted at the top, and which is driven a short distance into the ground, all as shown in Figs. 1 and 2. A hole is made through the overlapping ends of the upper boards, $a$, and the end of the hook $f$ passes through the said hole and through a washer, $e$, as shown in Figs. 1 and 2. Then, by pressing down on the lower end of the brace $d$ the hook $f$ clamps the washer to the board, pressing the two boards firmly together, and the washer $e$ prevents the point of the hook from cutting into the boards. A V-shaped hole, $s$, is dug at the bottom of the brace $d$, so that the rod $g$ may be let down into the ground and be in a direct straight line with the said brace, as shown. One end of the rod $g$ passes through the lower end of the brace $d$, and it is more firmly secured by the staple $i$, which is driven into the said brace over the said rod $g$. A hole is formed in the lower end of the rod $g$, through which the pin $i'$ is driven at an angle of about forty-five degrees, as shown in Figs. 1 and 2. The hole is filled up after the pin has been driven, so that the freezing of the ground cannot work the said pin or rod $g$ loose.

In Fig. 3 a modification of the rod $g$ is shown, wherein the pin $i'$ is dispensed with by flattening or forming a head on the end of the said rod, instead of making a hole in it, as heretofore described. The hole $s$ is also dispensed with as the rod is set out, as shown in dotted lines in Fig. 3, and then driven into the ground in the direction indicated by the arrow and by the dotted lines in said figure, leaving it in a direct straight line with the brace $d$, so that it must be drawn out at a right angle from the direction it was driven before the fence can move or incline laterally. After the rod $g$ has been driven the staple $i$ is driven over the rod, holding it firmly, as hereinbefore described and shown in Fig. 3.

The braces $d$ may all be placed on one side of the fence or as shown in Fig. 1. The wires $c$ are used in any number, as desired, or the fence may be made entirely of boards.

Having thus described my invention, I claim the following and desire to secure the same by Letters Patent:

The combination, with two fence-panels whose boards overlap at their ends, of a hook passing through said overlapped ends and held by a washer, foot-posts $k$, and a diagonal brace secured at its upper end by the downwardly-turned end of said hook, and provided at its lower end with a perforated rod, $g$, the latter being designed to be inserted into a hole in the ground and held at its lower end by a pin, which latter is covered by earth, substantially as set forth.

STEWARD WILLIAMS.

Witnesses:
A. G. ADAMSON,
M. L. WRIGHT.